United States Patent [19]

Hollick

[11] Patent Number: 4,774,932
[45] Date of Patent: Oct. 4, 1988

[54] METHOD AND APPARATUS FOR PREHEATING VENTILATION AIR FOR A BUILDING

[76] Inventor: John C. Hollick, 15 Melissa Court, R.R. #2, Maple, Ontario, Canada, L0J 1E0

[21] Appl. No.: 162,477

[22] Filed: Mar. 1, 1988

[30] Foreign Application Priority Data

Feb. 11, 1988 [CA] Canada .................................. 558743

[51] Int. Cl.⁴ ................................................ F24J 3/02
[52] U.S. Cl. .................................. 126/428; 126/419; 126/431; 126/444; 126/447
[58] Field of Search ...................... 34/93; 98/37, 39.1; 126/419, 428, 431, 444, 447, 448, 429

[56] References Cited

U.S. PATENT DOCUMENTS

| | | | |
|---|---|---|---|
| 4,098,262 | 7/1978 | Peters | 126/444 |
| 4,143,815 | 3/1979 | Meysenburg | 126/428 X |
| 4,287,683 | 9/1981 | Louwenaar | 126/419 X |
| 4,379,449 | 4/1983 | Wiggins et al. | 126/431 X |

FOREIGN PATENT DOCUMENTS

| | | | |
|---|---|---|---|
| 1196825 | 11/1985 | Canada | 126/431 |
| 2840022 | 3/1980 | Fed. Rep. of Germany | 126/419 |
| 2382650 | 11/1978 | France | 126/428 |

*Primary Examiner*—Harold Joyce
*Attorney, Agent, or Firm*—Sim & McBurney

[57] ABSTRACT

Ventilation air for a building is preheated by providing on a south facing wall a sunlight-absorbent corrugated collector panel with the corrugations vertical, thus defining vertical channels between the panel and the wall, and vertical grooves on the exterior of the panel. Outside air passing upwardly along the channels is heated by a combination of solar heat from the panel and heat being lost from the interior of the building through the wall. Air passing upwardly along the grooves is heated by solar heat from the panel. The thus heated air is withdrawn from the channels and grooves and expelled into the interior of the building.

12 Claims, 2 Drawing Sheets

METHOD AND APPARATUS FOR PREHEATING VENTILATION AIR FOR A BUILDING

This invention relates generally to a method and apparatus for controlling the entry of ventilation air into a building, and preheating the air with a combination of solar heat and the natural building heat loss.

BACKGROUND OF THIS INVENTION

Commercial and industrial buildings require ventilation, and it is common for the natural leakage around doors, wall-ceiling joints, etc. found in standard building construction to allow sufficient ventilation air to enter the building. A pressure drop from the exterior to the interior of the building can arise from many factors, such as high winds, exhaust fans and combustion air for fuel-burning furnaces. This tends to draw outside air into the building through any crack or opening.

The problem with the conventional approach is that the amount of ventilation air is not controlled, and additional heat must be provided to heat the outside air to room temperature during the fall, winter and spring months.

This problem has typically been solved by installing air make-up fans with gas or electric heaters to heat the incoming air. When solar panels are used to heat a building, air is re-circulated from the building through the panels and then back again to the building. The efficiency of a solar collector is maximized when the temperature of the air entering the collector is the same as the ambient temperature. Under normal winter conditions, the ambient temperature is lower than the room temperature, and therefore a recirculating solar collector operates at a much reduced efficiency level in wintertime.

My own earlier Canadian Pat. No. 1,196,825, issued Nov. 19, 1985 and entitled "Method for Preheating Ventilation Air in a Building" describes a method and apparatus which avoid using consumable energy sources like gas or electricity to heat incoming air for a building, and instead of simply recirculating interior air from the building through a solar collector and back to the building, it introduces fresh make-up air for ventilation purposes into the interior of the building after first passing the air through a solar collector located on a south-facing wall of the building. The solar collector in my earlier patent consists of glazing over a darkened wall. Air moving means, such as a fan and duct arrangement, is used to gather air at the top of the solar collector and force it into the building.

GENERAL DESCRIPTION OF THIS INVENTION

I have now devised a simpler and less expensive structure for accomplishing essentially the same thing as is accomplished by the apparatus disclosed in my earlier Canadian Pat. No. 1,196,825.

More specifically, this invention provides a method of preheating ventilation air for a building having a south facing wall through which heat from the interior of the building escapes, the method comprising the steps:

(a) providing on the south facing wall of the building a sunlight-absorbent corrugated collector panel with the corrugations running substantially vertically, thus defining a plurality of substantially vertical grooves on the exterior of the panel, (b) passing outside air upwardly along said grooves, (c) heating the air in the grooves with a combination of solar heat from the collector panel and heat being lost from the interior of the building through the south facing wall, and (d) withdrawing heated air from the grooves at a location near the top of the panel, and using air-moving means to expel the heated air into the interior of the building.

Further, this invention provides apparatus for preheating ventilation air for a building have a south facing wall through which heat from the interior of the building escapes, comprising:

a sunlight-absorbent corrugated collector panel provided on the south facing wall with the corrugations running substantially vertically, thus defining a plurality of substantially vertical grooves on the exterior of the panel, air-moving means having an inlet at the top of the panel for receiving air that has been heated during upward passage through the grooves, and having an outlet within the interior of the building.

GENERAL DESCRIPTION OF THE DRAWINGS

Several embodiments of this invention are illustrated in the accompanying drawings, in which like numerals denote like parts throughout the several views, and in which.

DETAILED DESCRIPTION OF THE DRAWING

Figure 1:
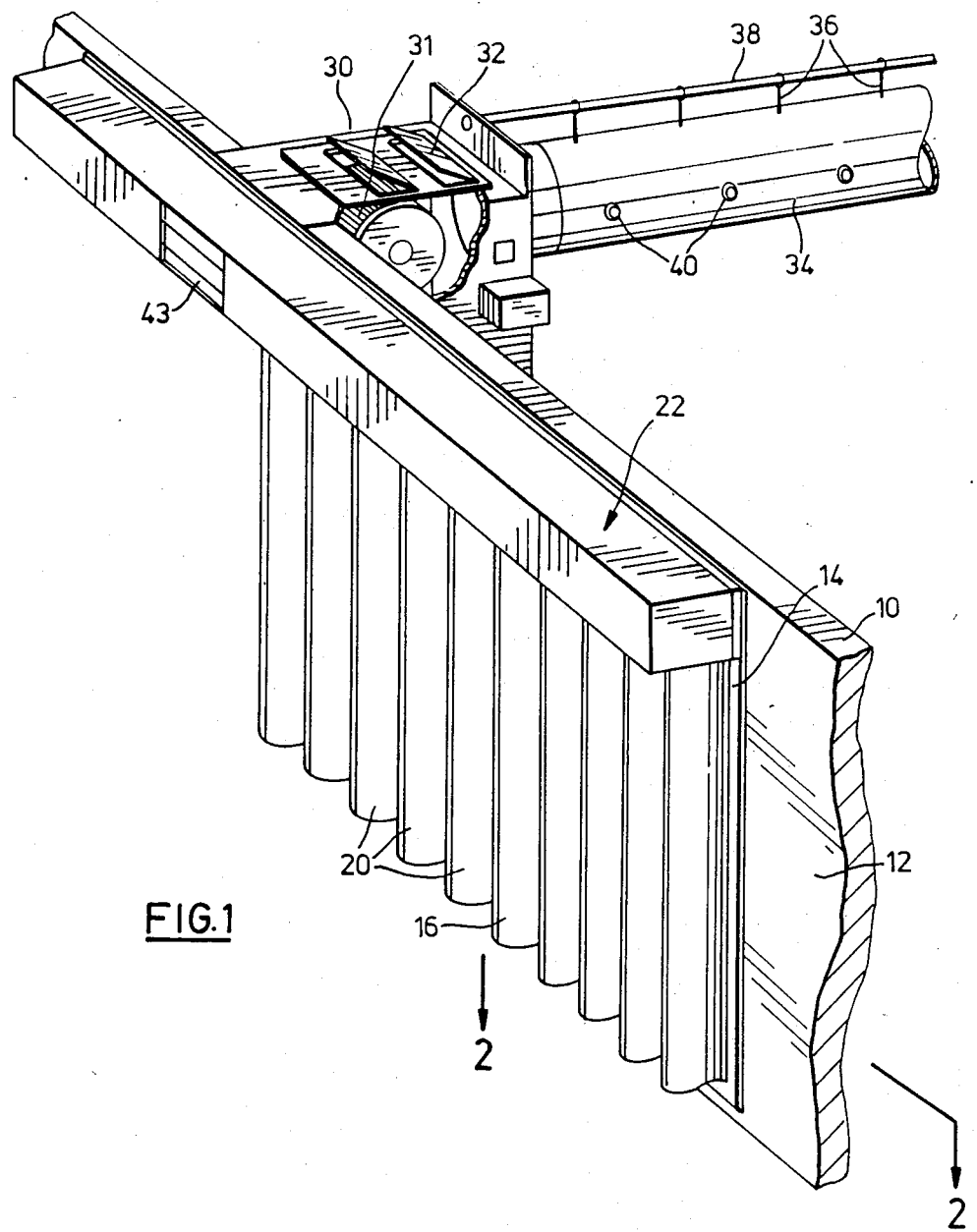
FIG. 1 is a perspective view of a make-up or ventilation air system for a building, constructed in accordance with this invention.

Attention is first directed to FIG. 1 which shows a partly broken-away perspective view of a system for carrying out the present invention. A building wall is shown in part at 10 in the Figure, this being typically a block construction, or a block-and-brick composite structure. As with all building walls, even those well-insulated, a steady heat loss is experienced through the wall when the outside temperature is below the inside temperature.

The wall 10 has an outer surface 12 to which is affixed a mounting plate 14. The plate 14 may be mounted by Z-bars or the like, thus spacing the plate away from the wall 10 to allow for irregularities in the latter. Secured to the mounting plate 14 is a corrugated collector panel 16 which is coated on the outside with a heat-absorbent material, such as black paint. The collector panel 16 is disposed with the corrugations running vertically, thus defining a plurality of substantially vertical channels 18 between the panel and the wall 10 (see FIG. 2), and further defining a plurality of substantially vertical grooves 20 on the exterior of the panel 16.

At the top of the panel 16 there is provided an air collection plenum 22 which can be rectangular in section. In one version of the invention, both the vertical channels 18 and the vertical grooves 20 open to the underside of the plenum 22, so that air which is heated during upward passage through the channels and the grooves can be collected therein. In another version of the invention, only the vertical grooves 20 open to the underside of the plenum 22, and the channels 18 do not communicate with the plenum.

Communicating with the internal chamber of the plenum 22 is a fan housing 30 which contains a conventional fan or air-impeller 31 and includes motorized dampers 32 which allow air from the interior of the building to be mixed with heated air coming from the plenum 22.

Communicating with the housing 30 is a fabric air duct 34 which is preferably flame retardant and made of polyfabric, the duct 34 being suspended by a plurality of duct hangers 36 from a suitably strung support wire or rod 38. The air duct 34 has a plurality of openings 40 through which the heated outside air can pass from the duct 34 into the interior of the building. By appropriately sizing the openings 40, the air can enter the interior of the building as a high-velocity air jet, thus promoting good mixing within the interior of the building, and minimizing stratification.

It is preferred that the duct 34 be located at ceiling level within the building, for the sake of convenience. However, other levels could also be utilized. The fan within the housing 30 would typically be sized to meet the ventilation requirements and eliminate the negative pressure problem if such exists. A positive pressure can be achieved with outside air entering the building through the fan in the housing 30, the air being heated by the solar heat, the building heat loss, and stratified heat found near the ceiling. Air can then leave the building through the cracks and openings where previously air had entered.

It will be noted that the plenum 22 overhangs the corrugated panel 16, and thus a shadow is cast upon the panel 16 during late spring and early summer, when the sun at mid-day is quite high in the sky. This automatically avoids solar heating of the air during the hotter portion of the year. Alternatively, as shown in FIG. 1, the plenum 22 can be provided with a by-pass damper 43 which can be opened when heating is not required, so that the fan or air-impellar 31 draws fresh air in directly from outside, and does not capture any heated air moving upwardly along the wall in the grooves 20 or channels 18.

It will thus be appreciated that, in a combination operation, outside air passes upwardly along the channels 18 and the grooves 20, thence into the space defined under the hood 22. In the upward passage along the channels 18, the air is heated by a combination of solar energy transmitted by conduction through the corrugated panel 16 and heat escaping from the inside of the inside of the building through the wall 10. The air passing upwardly along the grooves 20 is heated by conduction from the corrugated panel 16, using solar heat that normally would be lost to the atmosphere. The heated air is then withdrawn from the channels and grooves into the space beneath the hood 22, thence impelled by the fan 31 into the interior of the building.

The profile of the corrugations defined by the collector 16 can vary, depending upon the air volume required, the area of the south wall, and the general wind conditions. Larger air volumes would require most or all of the air to be drawn from the grooves 20, whereas smaller air volumes would use more air from the channels 18, or equal quantities from the grooves and channels.

Figure 3:
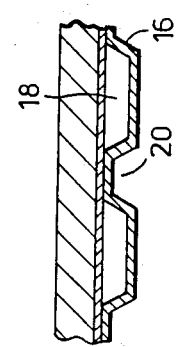

The embodiment illustrated in FIG. 3 is one which provides a greater air volume behind the collector (i.e. in the channels 18) than in front of the collector.

Figure 4:
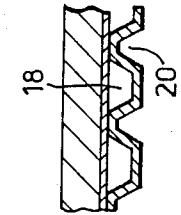

The embodiment of FIG. 4 has only slightly greater volume in the channels 18 than in the grooves 20.

Figure 5:
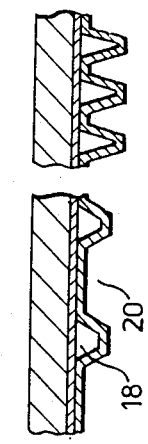

The embodiment of FIG. 5 has more volume in the grooves 20 than in the channels 18.

Figure 2:
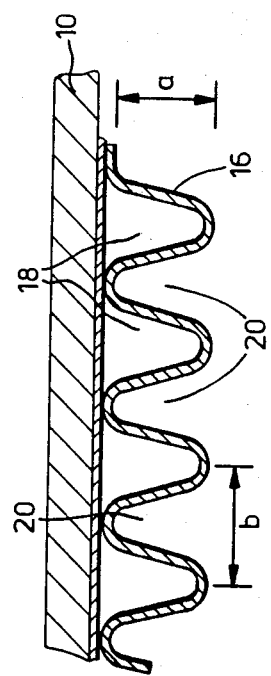
FIG. 2 is a sectional view through the structure of FIG. 1, taken at the line 2—2.
Figure 6:
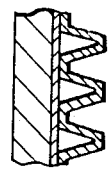
FIGS. 3, 4, 5 and 6 are horizontal sectional views similar to FIG. 2, showing four alternative configurations for the collector.

The embodiment illustrated in FIG. 6 is similar to that illustrated in FIG. 2, and has deep grooves for very windy locations.

Any of the configurations shown in FIGS. 3–6 could be used for groove collection alone, or for collection of air moving through both the grooves and the channels. This would depend upon volume required, and wind exposure conditions.

Finally, it would be possible to use the structure of the collector panel, possibly including the mounting plate 14, to constitute the south wall itself, without having to mount the structure into an existing wall.

Figure 7:
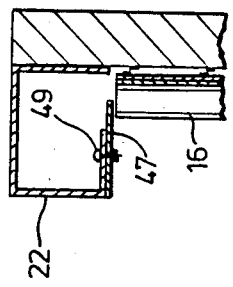
FIG. 7 is a vertical sectional view through the air-collection plenum shown at the top in FIG. 1.

Attention is now directed to FIG. 7, which shows that the rectangular plenum 22 can be provided with an adjustable baffle 47, adapted to close off the tops of the channels and grooves defined by the collector 16. A manual fastener 49 is provided to secure the baffle 47 in any desired position. The grooves and channels would be closed off in hot, summer conditions when no heating of the building is required. At such times, the by-pass damper 43 would be open.

While one embodiment of this invention has been illustrated in the accompanying drawings and described hereinabove, those skilled in the art will appreciate that changes and modifications may be made therein without departing from the essence of this invention, as set forth in the appended claims.

The embodiments of the invention in which an exclusive property or privilege is claimed are defined as follows:

1. A method of preheating ventilation air for a building having a south facing wall through which heat from the interior of the building escapes, the method comprising the steps:
    (a) providing on the south facing wall of the building a sunlight-absorbent corrugated collector panel with the corrugations running substantially vertically, thus defining a plurality of substantially vertical grooves on the exterior of the panel,
    (b) passing outside air upwardly along said grooves,
    (c) heating the air in the grooves with a combination of solar heat from the collector panel and heat being lost from the interior of the building through the south facing wall, and
    (d) withdrawing heated air from the grooves at a location near the top of the panel, and using air-moving means to expel the heated air into the interior of the building.

2. The invention claimed in claim 1, in which a plurality of substantially vertical channels are defined between the collector panel and the wall, air in said channels being heated by solar heat and heat lost from the interior of the building through the south-facing wall, heated air being withdrawn from the channels as well as from the grooves.

3. The invention claimed in claim 1, in which the heated air is expelled into an interior space of the building near the top of such interior space.

4. The invention claimed in claim 1, which further includes the step of shading the collector panel from the sun's rays when the sun is higher in the sky, by providing a permanent hood means at the top of the panel, the hood means overhanging the panel.

5. The invention claimed in claim 2, which further includes the step of shading the collector panel from the sun's rays when the sun is higher in the sky, by providing a permanent hood means at the top of the panel, the hood means overhanging the panel.

6. The invention claimed in claim 2, in which the heated air is expelled into an interior space of the building near the top of such interior space.

7. Apparatus for preheating ventilation air for a building have a south facing wall through which heat from the interior of the building escapes, comprising:
   a sunlight-absorbent corrugated collector panel provided on the south facing wall with the corrugations running substantially vertically, thus defining a plurality of substantially vertical grooves on the exterior of the panel,
   air-moving means having an inlet at the top of the panel for receiving air that has been heated during upward passage through the grooves, and having an outlet within the interior of the building.

8. The invention claimed in claim 7, in which the air-moving means includes plenum means overhanging the panel and shading the same from the sun's rays when the sun is high in the sky.

9. The invention claimed in claim 7, in which said inlet is adjustable in size.

10. The invention claimed in claim 7, in which the collector panel further defines a plurality of substantially vertical channels between the panel and the wall, the channels having open bottoms and being adapted to deliver air to said air-moving means, whereby air can pass upwardly through said channels and be heated by a combination of solar heat and heat lost through said wall from the interior of the building.

11. The invention claimed in claim 10, in which the air-moving means includes plenum means overhanging the panel and shading the same from the sun's rays when the sun is high in the sky.

12. The invention claimed in claim 10, in which said inlet is adjustable in size.

* * * * *